United States Patent Office 3,102,113
Patented Aug. 27, 1963

3,102,113
UNORIENTED PARTICULATE DEAE-CELLULOSE
ION EXCHANGE MATERIAL
Alan Humphrey Raper, Gerrards Cross, and Arthur Ronald Lockwood, Darlington, England, assignors to Glaxo Group Limited, Greenford, England, a British company
No Drawing. Filed Oct. 25, 1960, Ser. No. 64,712
Claims priority, application Great Britain Oct. 26, 1959
4 Claims. (Cl. 260—231)

The present invention concerns improvements in or relating to cellulosic ion-exchange materials.

$\alpha$-Cellulose powder has been modified by suitable treatment to yield products having anion or cation-exchange properties (Sobers and Peterson, J.A.C.S., 1954, 76, 1711–1712; ibid., 1956, 78(4), 751–755; Sobers et al., J.A.C.S., 1956, 78(4), 756–763). One product having anion-exchange properties was obtained by treating strongly alkaline $\alpha$-cellulose powder with 2-chloro-N,N-diethylethylamine. This product, referred to as DEAE-cellulose, has found application as an ion-exchange adsorbent for proteins and proteinaceous materials, e.g. enzymes, since relatively large amounts of protein may be adsorbed onto and eluted from DEAE-cellulose under mild conditions. $\alpha$-Cellulose appeared particularly promising to the above workers because of its hydrophilic nature and large surface, the latter property being of importance in determining the adsorptive capacity of the modified, DEAE-cellulose. The other factor affecting the adsorptive capacity of DEAE-cellulose is the number of active groups that can be introduced into the cellulose; experiments show, however, that the more diethylaminoethyl groups there are present, the more gelatinous and water-soluble becomes the cellulose so that in practice there is a limit to the number of ion-exchange groups which can be introduced, although diethylaminoethylation may not then be complete.

In the operation of ion-exchange processes on a commercial scale, it is generally preferable to employ a continuous, rather than a batchwise, process and, thus, in the case of DEAE-cellulose, it is desirable to have a material suitable for column operation. Ion-exchange materials suitable for commercial operation should thus possess, as far as possible, the following properties:

(1) A porous nature so that a large number of active groups is presented to the liquid being treated;

(2) A sufficiently open structure to permit a good flow of liquid through the column;

(3) An approximately standard particle size in order that, during packing of the column, the material is not segregated by differential sedimentation. A regular particle size also helps to prevent the occurrence of channelling and aids the maintenance of a regular flow throughout the cross-section of the column;

(4) The particles of the material should be sufficiently discrete, so that they do not clump or aggregate and so that the column of material may be backwashed and fluidised, for example to remove extraneous matter;

(5) The particles of the material should be sufficiently rigid in aqueous salt solutions and mild acid and alkaline reagents so that they maintain their physical form during adsorption, elution and regeneration and do not pack or settle to such an extent that the flow rate becomes impracticable.

DEAE-cellulose material as prepared by prior methods generally possesses the first of these properties but, because of its fine, slightly gelatinous, powder form, tends to clump very readily, cannot readily be backwashed and does not lead to a satisfactory flow rate. Furthermore, after a number of regenerations, it becomes too gelatinous to be of further use in a column.

Following research into the preparation of DEAE-type ion-exchange material from a number of cellulose sources, we have discovered that one such source in particular enables a DEAE-cellulose ion-exchange material to be prepared which is particularly satisfactory for commercial operation in columns and, in many respects, approaches the desiderata for an ideal ion-exchange material mentioned above. The cellulose used in the preparation of our new ion-exchange material may be characterised as having an essentially unoriented structure as distinct from the more organised structure of naturally occurring celluloses and normal regenerated celluloses, e.g. viscose rayon; such cellulose possesses an open molecular structure and is generally unoriented.

In accordance with the invention, therefore, we provide an ion-exchange material comprising a cellulose bearing diethylaminoethyl substituents in which said cellulose has an essentially unoriented structure. The cellulose may be in any suitable form, but is preferably in particle form.

Essentially pure unoriented cellulose is obtainable from the sodium xanthate complex used in the production of viscose rayon, conveniently by very slow extrusion into an acid bath without tension. This process thus differs from the normal viscose rayon process in which the fibres produced possess a substantial degree of orientation as a result of applied tension.

As conveniently prepared, the essentially unoriented cellulose used in accordance with this invention is in rod or filamentary form and is conveniently first processed into particles of a suitable size for use in an ion-exchange column, before introduction of the ion-exchange group. The particles may be of any convenient size but preferably not larger than 10 B.S. mesh. We have found particles of between 16 and 52 B.S. mesh to be particularly satisfactory.

The unoriented cellulose we particularly prefer, "Rayon Monofil," is normally supplied as a monofilament of 1,000 to 60,000 denier and, for present purposes, a particularly suitable monofilament is one of 25,000 denier. This material may be converted into particles of a suitable size by any convenient manner, for example by cutting into small pieces of say $\frac{1}{4}''$ in length, followed by milling to particles of random shape and suitable size.

The cellulose particles are then treated to introduce the diethylaminoethyl groups by any convenient method. They may, for example, be reacted with an alkali metal hydroxide to form an alkali metal derivative of the cellulose which is then reacted with a diethylhaloethylamine, preferably in the form of a hydrohalide. It is particularly convenient to use caustic soda and diethylchloroethylamine.

The new ion-exchange material of this invention in general has a loose structure which is readily substituted by DEAE groups and which can be penetrated by molecules of substances to be adsorbed. Thus, particles of our new material in general present a large number of active groups to the liquor to be treated. For example, we have found that the ion-exchange material according to the invention can be prepared with exchange capacities of from about 0.1 to about 2.0 meq./g. (dry weight). Particularly useful materials is that having an exchange capacity of from 0.3 to 1.6 meq./g. dry weight).

By suitable choice of particle size, a good flow of liquid through a column can readily be maintained and, in particular, better flow rates can be obtained than with DEAE-celluloses hitherto available.

The ion-exchange material of this invention can be made in particles similar to those of conventional ion-exchange resins, i.e. as discrete particles, which do not generally aggregate into lumps. In particular, the ion-exchange materials of this invention can be produced in a form which may be up-flow backwashed and air-blasted like a conventional ion-exchange resin. It should, however, be noted that if it is attempted to produce the new material with an exchange capacity much above 2.0 meq./g., the material may tend to gel or be water-soluble, as is the case with known DEAE-cellulose.

The new materials according to this invention in general possess good stability and, in particular, show improved stability to alkalis and maintain their particulate form well. Thus, the ion-exchange materials according to the invention may often be regenerated many times with little alteration in their properties, although change in volume may be observed, the flow rate, however, remaining in general fairly constant.

It may be noted that we have found that ion-exchange materials according to the invention prepared from particles of 60–200 B.S. mesh have a slightly higher exchange capacity than materials of the preferred particle size (from particles of 16–52 B.S. mesh), but this increased capacity is not proportional to the increased surface area and the flow rate tends to become unduly reduced for use in large scale operation.

The new ion-exchange materials of this invention may be used for the adsorption of many substances. Thus, for example, while it may generally be used wherever DEAE-cellulose has hitherto been used, e.g. for separation and purification of proteins, etc., we have found that the new material is very useful in the purification and/or concentration of fungal α-amylase. The new materials may also be used for the purification and/or concentration of, for example, poliomyelitis virus and vitamin $B_{12}$ acid (by adsorption), and vitamin $B_{12}$ (by adsorption of impurities while the vitamin passes through the column). These materials can also be used to demineralise water.

In order that the invention may be well understood, the following examples are given by way of illustration only:

*Example 1.—Preparation of Ion-Exchange Material*

About 2 kilograms of 25,000 denier rayon monofilament, being first quality "Rayon Monofil" from Courtaulds Limited, Coventry, were hand cut into pieces about ¼" in length and then passed through a Raymond laboratory hammer mill without screens. The material was sieved to give a fraction of 1.058 kilograms passing 16 B.S. mesh and retained on 52 B.S. mesh. This fraction was mixed at 11° C. for one hour with 5.3 litres of a 6 N solution of sodium hydroxide. A solution of 1.058 kilograms of diethylchloroethylamine hydrochloride in 1.6 litres of water was added and mixed continuously at 85° C. for 35 minutes. The mixture was cooled to room temperature and acidified by the addition of 2.5 litres of concentrated hydrochloric acid. The ion-exchange material was recovered by filtration, washed with 12 litres of tap water, 5.3 litres of 1 N sodium hydroxide solution and then with tap water until the washings were almost neutral.

This ion-exchange material was then prepared for use in the adsorption of fungal α-amylase broth in the manner described in the following example.

*Example 2*

The material prepared as described in Example 1 was filled into a 10 ft. x 2 in. diameter glass column as a suspension in water to give a 7 ft. bed of about 4.2 litres volume. This bed was buffered with 8.4 litres of 0.1 molar phosphate at pH 6.6 fed downflow at 8.4 litres per hour.

75 litres of fungal α-amylase broth at a dextrinising activity of 14.0 units per ml., equivalent to 1,050 kilo units total activity, were adjusted to pH 6.6 with acetic acid, passed through a sterilising grade of filter paper and fed downflow through the adsorbent bed at 4.2 litres per hour and followed by 4.2 litres of water as displacement wash at 4.2 litres per hour. Analysis of the column effluent showed 1.7 kilo units total dextrinising activity, giving 1,048.3 kilo units adsorbed, equivalent to 99.8% efficiency. The adsorbed amylase was recovered by downflow elution with 4.2 litres of 0.8 molar acetate/0.8 molar sodium chloride buffer at pH 4.7, followed by a 4.2 litres displacement water wash, all at 2.1 litres per hour. A 7 litre portion of the eluate contained 992.2 kilo units total dextrinising activity, representing 94.6% efficiency and a ten-fold concentration of the original broth.

The column was regenerated by downflow wash with 8.4 litres of N 10 sodium carbonate solution containing 2.5% sodium chloride, washed with water and rebuffered with phosphate, as previously described.

We claim:

1. An ion-exchange material consisting of discrete particles not larger than 10 British Standard mesh of unoriented diethylaminoethylated cellulose having an ion-exchange capacity of from 0.1 to 2.0 meq./g., dry weight, said unoriented cellulose being a monofilament of 1,000 to 60,000 denier prepared by slow extrusion of sodium xanthate cellulose without tension into an acid bath.

2. The ion-exchange material according to claim 1 wherein the monofilament is 25,000 denier.

3. The ion-exchange material according to claim 1 having an ion-exchange capacity of 0.3 to 1.6 meq./g., dry weight.

4. An ion-exchange material as claimed in claim 1 in which the particles are between 16 and 52 British Standard mesh.

References Cited in the file of this patent

UNITED STATES PATENTS

| | | |
|---|---|---|
| 1,777,970 | Hartmann | Oct. 7, 1930 |
| 2,181,264 | Dreyfus | Nov. 28, 1939 |
| 2,349,797 | Bock et al. | May 30, 1944 |
| 2,952,586 | Okunki et al. | Sept. 13, 1960 |
| 2,982,696 | Puetzer et al. | May 2, 1961 |